(12) United States Patent
Yao Dibi

(10) Patent No.: US 10,730,487 B2
(45) Date of Patent: Aug. 4, 2020

(54) MOTOR VEHICLE RIM CLEANING BRUSH

(71) Applicant: Jean Max Yao Dibi, Montreuil (FR)

(72) Inventor: Jean Max Yao Dibi, Montreuil (FR)

( * ) Notice: Subject to any disclaimer, the term of this patent is extended or adjusted under 35 U.S.C. 154(b) by 137 days.

(21) Appl. No.: 15/746,410

(22) PCT Filed: Jul. 13, 2016

(86) PCT No.: PCT/EP2016/066692
§ 371 (c)(1),
(2) Date: Jan. 21, 2018

(87) PCT Pub. No.: WO2017/012960
PCT Pub. Date: Jan. 26, 2017

(65) Prior Publication Data
US 2018/0201234 A1  Jul. 19, 2018

(30) Foreign Application Priority Data
Jul. 20, 2015 (FR) ..................... 15 01535

(51) Int. Cl.
*B60S 3/04* (2006.01)
*A46B 5/00* (2006.01)
*A46B 11/00* (2006.01)

(52) U.S. Cl.
CPC .............. *B60S 3/042* (2013.01); *A46B 5/002* (2013.01); *A46B 11/001* (2013.01); *B60S 3/045* (2013.01); *B60S 3/047* (2013.01); *A46B 2200/405* (2013.01)

(58) Field of Classification Search
CPC ..... A46B 5/0012; A46B 5/0095; A46B 9/026; A46B 2200/3046; B60S 3/042; B60S 3/045; B60S 3/047
See application file for complete search history.

(56) References Cited

U.S. PATENT DOCUMENTS 1,936,757 A * 11/1933 Garvey .................. B60S 3/042
401/10
2,975,447 A * 3/1961 Vuchinas ................ B60S 3/042
15/53.4

(Continued)

FOREIGN PATENT DOCUMENTS

GB      1 550 111 A    8/1979
KR   2011 0055350 A    5/2011

*Primary Examiner* — David P Angwin
*Assistant Examiner* — Bradley S Oliver
(74) *Attorney, Agent, or Firm* — Im IP Law; Chai Im; C. Andrew Im

(57) ABSTRACT

A brush having manual or automatic operation for maintenance of mechanical rims or any object placed on top of the rims. Access to the inside of the rims is difficult due to the obstacle that the spokes and the brake disc constitute, whereby cleaning is often imperfect and residual dirt remains despite the broad range of existing products. A perfectly clean rim requires tedious cleaning using unsuitable brushes or cloths, at the price of one or more hand injuries. A brush is provided in a kit made up of elements that can be associated with one another. A horizontal body is associated with a main vertical body or a secondary vertical body, allowing areas that are difficult to access and the arms of the rim to be cleaned in a single movement without the hand ever touching any part of the wheel, thus avoiding injuries and saving time.

13 Claims, 15 Drawing Sheets

(56) References Cited

U.S. PATENT DOCUMENTS

| | | | | |
|---|---|---|---|---|
| 5,758,380 | A * | 6/1998 | Vrignaud | A46B 5/0012 15/106 |
| 6,996,870 | B2 * | 2/2006 | Hohlbein | A46B 5/002 15/110 |
| 7,861,359 | B1 * | 1/2011 | Ratzlaff | A46B 5/00 15/159.1 |
| 7,909,526 | B2 * | 3/2011 | Wales | A46B 5/0008 401/25 |
| 9,210,997 | B2 * | 12/2015 | Repchuk | A46B 17/06 |
| 9,265,334 | B1 * | 2/2016 | Fung-A-Wing | A46B 5/0008 |
| 9,283,595 | B1 * | 3/2016 | Cooper | B08B 1/002 |
| 9,986,817 | B1 * | 6/2018 | Wesley | A46B 9/026 |
| 10,117,555 | B2 * | 11/2018 | Schultheis | A47L 9/062 |
| 2004/0163195 | A1 * | 8/2004 | Pao | A46B 5/0054 15/167.2 |
| 2004/0250366 | A1 * | 12/2004 | Park | A46B 5/0025 15/167.1 |
| 2005/0210611 | A1 * | 9/2005 | Pelo | A46B 15/0055 15/106 |
| 2006/0127157 | A1 * | 6/2006 | Sims | A46B 11/002 401/11 |
| 2008/0047085 | A1 * | 2/2008 | Kolarevic | A46B 13/001 15/179 |
| 2011/0119847 | A1 * | 5/2011 | Gomes | B60S 3/045 15/114 |
| 2011/0225755 | A1 * | 9/2011 | Carlson | A46B 7/04 15/145 |
| 2018/0014632 | A1 * | 1/2018 | Charette | A46B 5/0012 |
| 2019/0248342 | A1 * | 8/2019 | Voelker | A46B 5/0016 |

* cited by examiner

MOTOR VEHICLE RIM CLEANING BRUSH

RELATED APPLICATIONS

This application is a § 371 application from PCT/EP2016/066692 filed Jul. 13, 2016, which claims priority from French Patent Application No. 15 01535 filed Jul. 20, 2015, each of which is incorporated herein by reference in its entirety.

FIELD OF THE INVENTION

The present invention relates to the cleaning and maintenance of wheels for motor vehicles or any other vehicles running on tires equipped with rims whose access is made difficult due to their shapes and structures. By extension, this invention also relates to any object which is superimposable to a rim and whose cleaning can be facilitated.

BACKGROUND OF THE INVENTION

For those regularly using carwashes, car maintenance is a real challenge that sometimes requires a lot of dexterity.

If the cleaning of a car body requires the use of a washcloth in order to obtain a perfect brilliance despite the solutions proposed by the car washes, access to this car body is simple unlike the rim whose access is complicated because of its architecture making thus the cleaning more difficult, particularly in its interior portion.

In order to facilitate the understanding of the presentation, we recall the definition of a rim and its anatomy. According to the dictionary, a rim is a mechanical portion of circular shape rotating about an axis.

It is closely related to several components:
 The tire meant to be fixed to the outside of the rim, which has no interest in this subject,
 The wobble which is the central element meant to be fixed inside the rim on the flange of the hub. The wobble is screwed by using wheel nuts.

The wobble is the central portion of the rim. It is meant to guide the wheel around the axle that connects the two wheels. The drum and the brake disc are also integral to the hub. The offset is the distance in millimeters between the vertical medial plane of the rim and the plane bearing on the hub. The smaller the offset, the more the rim comes out.

The wobble is composed of spokes or branches. Indispensable in the architecture and design elements thereof, the spokes are obstacles to a proper cleaning of a rim in that they hinder easy access to its inner portion that we will call "the rounded portion" (r).

There are different kinds of spokes. Among the classic three, five or seven branches, we find the spokes like a bike and, between these two, there are all the intermediate cases. Due to their arrangement, the spokes hinder access to the "rounded portion".

The brake disk (f) and the drum, which are generally a few centimeters from the rounded portion, also hinder access thereto.

Due to the arrangement of the spokes, the brake disc and the drum, several zones can be distinguished on the "rounded portion" (r): the zone upstream of the brake disc, which is of easy access, and zones of more complicated access that can be divided into three:
 the zone a (a) located on the "rounded portion" (r) downstream of the brake disc and drum which hinder access thereto;
 the zone b (b) located on the "rounded portion" (r) but hidden by the spoke of the rim;
 the zone c (c) represented by the posterior face of the spoke of the rim.

There are various solutions for maintaining wheels, namely industrial products in aerosol or application, brushes for manual cleaning, wash cloths or wipes.

Industrial products for rims in aerosol or application are certainly the most used. However, it needs a jet of water to remove the product in order to shine the rim. This is why these products are usually applied on the day of washing the entire vehicle.

The problem is that the application of the only product does not allow obtaining a perfect cleanliness and a satisfactory brightness, hence the residual dirt especially in above-mentioned zones. This is why a manual cleaning is still necessary.

There are different types of brushes for manual cleaning, but all have one thing in common: they have the shape of a bottle brush provided with a handle and a cleaning head whose end is rounded or bulky. The problem is that this shape is not adapted to that of the rim which is rounded in a frontal plane and is convex in cross section.

Sometimes the end is so bulky that it cannot slip under the brake disc, thus hindering the cleaning of the portion of the rounded portion (r) beyond the disc (a).

Moreover, during its use which is manual, it is necessary to bring the maintenance product because the shape of the rim does not allow to keep the liquid, hence an almost permanent juggling act.

Some add it with the help of a container while others do it by hand. Either you have to drop the brush in order to bring the product with the same hand, or you have to add it with the other hand.

Among these brushes, there are some whose wash cloth covers all the body. The problem is that this wash cloth moves during use because it is poorly fixed, complicating thereby a cleaning which is already very difficult.

In addition, after cleaning rims, the brush or the used wash cloth is impregnated with greasy dirt which is difficult to remove, hence the interest to remove it to wash it properly.

As for those who do not have a brush, they do the cleaning by hand with a wash cloth or a sponge and we saw that access to the inner portion of the rim is difficult especially because of the integral disc brake.

The result of the cleaning can be satisfactory according to the dexterity and the tips of the ones and the others but often at the price of one or more injuries of variable depth to the hand. The injury is the main problem of rim cleaning.

Time and discomfort further complicate the washing process. Indeed the difficulty of access requires the cleaning of the spaces between two spokes one after the other and therefore the repetition of movements that become eventually tiring rather quickly. Since there are at least four wheels on most vehicles, rim cleaning can be very long.

Nevertheless, the rim is clean only on the day of the cleaning and in the following days because a greasy dust quickly deposits thereon. While it is true that for car bodies there are quick cleaning solutions, for the rim it is more tedious given the problems inherent in its architecture.

Fast cleaning is possible but difficult. In other words, how is it possible to quickly clean the rims without having to resort to a thorough washing of the vehicle.

Thus, the difficulties related to the state of the art can be summarized to the difficulties of access to the inner portion of the rim, injuries, time, discomfort, instability of the cloths during cleaning and fast cleaning.

OBJECT AND SUMMARY OF THE INVENTION

The device according to the invention makes it possible to remedy all these difficulties. It is proposed a brush the operation of which is manual but which is adaptable to an automatic operating system, whose characteristics allow its mobilization inside the rim. Its function is to optimize each movement in order to clean the maximum surface in a minimum of time, to allow access to difficult zones, possibly to bring the cleaning liquid by pushing a button during the cleaning, and possibly to clean the adjacent tire portion, but at no time does the hand touch any portion of the wheel to prevent injury from happening.

The device respects the structure of any brush, i.e. a portion activates the cleaning head that comes into contact with dirt, a more or less apparent neck, a handle and sometimes and other accessories.

Given the variety and complexity of the rims, the device can be proposed in several variants particularly at the cleaning head but respects a constant basic structure namely a cleaning head which is the functional unit (4), which can itself be divided into a horizontal body (1), a main vertical body (2) and a secondary vertical body (3) associated with a handle. These elements can operate independently.

The device is a brush which can be manually operated but which is adaptable to an automatic operating system for cleaning automobile rims or any other superimposable object which, according to a first feature, has the form of a self-assembly kit necessarily comprising a handle (5), a cleaning head represented by either a horizontal body (1) or a main vertical body (2), or a secondary vertical body (3), or a functional unit (4), and accessories whose presence is not compulsory, namely a base (6), a reservoir (9), pipes (10), a button (41), a crank (7) with its cylindrical hollow sleeve (8), a specific coating covering the active faces (44) provided with orifices (43).

According to a second feature, the association of said horizontal body (1) and main vertical body (2) forms the functional unit (4) with which may be associated said secondary vertical body (3) and said horizontal body (1), said main vertical body (2), said functional unit (4) being able to be fixed at notches (40) in the base (6).

According to a third feature, said functional unit (4) and its components, namely said horizontal body (1), said main vertical body (2), possibly said secondary vertical body (3), each represent a cleaning head shape with which a handle (5) is associated, the assembly being able to be associated or not with the base (5), the crank (7) provided with its hollow cylindrical sleeve (8), the reservoir (9), pipes (10) provided with its orifices (43), the button (41), the coating, the association of the elements of the kit being be partial or total, and even if the result of this association is cast in one piece and whatever the method for fixing said elements.

According to a fourth feature, the horizontal body (1), operating horizontally, is itself composed of two portions. An inner portion (11) of thin thickness which follows, in the frontal plane, a concave shape which matches the "rounded portion" (r) of the rim and which can be subdivided into several branches giving the single (18), double (19) or multiple (20) shapes. Multiple in this context means at least 3 branches. An outer portion (12) also of thin thickness and inclined with respect to the plane of the inner portion (11) at a specific lateral angle (14) may vary between 0 and 90° excluded so that it matches the overhang of the rim with the possibility of contacting the adjacent tire portion.

This outer portion (12) may be rounded or planar or may have any intermediary shape. Similarly, it may include angles, beak points so that its shape adapts as much as possible to that of the cleaned rim. The horizontal body may also be composed of two symmetrical horizontal half-bodies resulting from the splitting of said horizontal body along the median line, giving thereby the double horizontal body (21).

According to a fifth feature, as the outer portion (12) is always narrower than the inner portion (11), the junction zone of these two portions becomes automatically more hollow with a higher specific angle (13), even if the angle originates on the inner portion (11). This angle constituting the main trick of the invention allows the movements of the brush inside the rim and allows the cleaning of the area just behind the spoke (b).

According to a sixth feature, the horizontal body may be pierced with a hole (15) for the valve to be fixed to the rim. The dimensions of this hole are defined so that the brush does not contact said valve when moving.

The single shape is adapted to rims whose space between two spokes is wide, such as 3, 5 or 7 spokes. The multiple shape is adapted to rims whose plurality of spokes singularly complicates access to the "rounded portion". Between these two, there are all the intermediate cases, among which the doubles shape.

Thus, as it perfectly matches the rim, this horizontal body (1) slides between "the rounded portion" (r) and the brake disc (f) reaching the difficult area (a) and without hitting the valve when one finds oneself in present of it, thanks to the hole (15).

Therefore, with a minimum of movement, it allows the cleaning of a large area of the "rounded portion" between two spokes including the difficult zone (a) and thanks to its angle (13), the area immediately behind the branch (b). This horizontal body therefore allows access to difficult zones and saves time.

The horizontal body may be provided with at least 2 types of appendixes. The proximal appendix or appendixes (16) are meant to fix the main vertical body or bodies (2).

The distal appendix or appendixes (17) are meant to fix the secondary vertical body or bodies (3).

In the various embodiments, the choice of the shape of the horizontal body is predefined. It can be single (18), double (19), multiple (20), double body (21) with or without a hole (15), with or without appendixes before associating with the other elements also predefined. The choice of the constituent elements is also valid in case the brush is cast in a single piece.

According to a seventh feature, the main vertical body, working in a vertical position, is composed of a support (22) with its appendix (23) and at least one branch, which can be divided into several branches, but all of them being supported by the same support giving as the horizontal body, a single branch (25), double branch (26) or multi-branches (27) vertical body. It can be fixed by means of its appendix (23) at the proximal appendix of appendixes (16) of the horizontal body (1). It can be single (28), double (29) or multiple (30), each on its support. In the second case, each main vertical body may be positioned symmetrically with respect to the other, meeting at their summit. It is also possible the both vertical bodies do not contact each other. And between these two, there are all the intermediate cases.

According to an eighth feature, each branch of the main vertical body (2) is composed of at least 2 faces of thin thicknesses. An inner face (31) and an outer face (32) are joined by an angle (33) which may vary from 0 to 180 degrees excluded. Each face may be flat, rounded or complex but always of thin thickness.

According to a ninth characteristic, the inner face (31) of the branch of the main vertical body may be less high and narrower than the outer face (32) so as to avoid any shock with each movement on the one hand against the top of the angle between two adjacent spokes of the rim and on the other hand against the brake disc. If there is a third face (34), it meets the same criteria as those of the inner face (31).

According to a tenth feature, each branch of the main vertical body is inclined in the frontal plane between 0 and 90 degrees excluded, as well as in the sagittal plane between 0 and 90 degrees excluded, allowing its adaptation to the inclination of the spoke of the rim. Once defined, the inclination is either caused by the supports at the moment of the fixation at the appendixes or imposed during the production process.

The main vertical body (2) enables, thanks to its inner (31) and outer (32) faces, the cleaning of the outer and inner faces of each spoke of the rim as well as the hub thanks to the zone formed by the union of its two branches.

Since the main vertical body (2) can be double and its two branches can be symmetrical and joined at the other end and it can be attached to the horizontal body (1), thus mobilized at the same time; it allows with the same movement the cleaning of two adjacent branches. Thus, with the horizontal body associated with the main vertical body, it is possible with the same movement to clean the "rounded portion" of the rim, the difficult zone located the brake disc (a), the difficult zone hidden by the spoke of the rim (b), the two adjacent branches and even the junction zone of the spokes of the rim, that is the hub. And this, at no time does the hand contact any portion of the rim. Therefore, the brush avoids injuries and saves time. In the various embodiments, the choice of the vertical body is predefined.

It can be a single, double, multiple, single branch, double branch or multi branch vertical body.

This vertical body is meant to function alone or in association with the horizontal body forming the functional unit which can itself be integrated with the base.

The vertical accessory body (3) is said vertical because it works in a vertical position. In the direction of the height, its edges can be rounded, straight or all the intermediate cases are possible between two but in all cases of fine thickness in order to be able to slip between the rim and the brake disk. It can work alone in association with a handle but it can also be fixed to the horizontal body at its distal appendix or appendixes (17). It allows the cleaning of the inner face of the spoke (c) of the rim which cannot be seen from the outside.

In case it works alone, it is fixed to a handle and can be associated with the other elements of the kit.

In case it is associated with the functional unit, it is possible to clean with one movement the rounded portion of the rim between two spokes, the difficult-access zone (a) beyond the disc brake, the difficult-access zone (b) hidden by the spoke of the rim and the rear face of the same spoke (c).

There is at least one handle (5) per device. It can be in the form of a cone or an arched handle and is therefore of variable shape. It can be positioned on the handle or it can be fixed to the horizontal body (1), the main vertical body (2), the accessory vertical body (3), the functional unit (4), or the base (6). Regarding the base (6), said handle (5) is fixed either directly or by means of the crank (7). The handle (5) can be double (36) and fixed to the double horizontal body (21). In this case its two portions are separated by a system for bringing them closer and then away according to whether it is in the rest position or the working position. The purpose of the maneuver is to bring close or away the two portions of the double horizontal body (36) so as to avoid the arm to have said movement.

The handle allows to mobilize the entire device and to access the button (41) without changing hands during washing.

The position of the handle is variable but must not interfere with movement or hit any portion of the rim.

According to a eleventh feature, the handle can be pivoted, tilted (38) in the opposite direction and/or adaptable to an additional circular handle (39) or to a telescopic handle via locations provided for this purpose and this, regardless of the type of location and the nature of the fixation. Indeed, due to the shape of the rim, which is circular, and its low position, the rime must be lowered so as to be cleaned. The cleaning of the lower portion of the rim is relatively easy but the upper portion, which cannot be seen if not highly lowered, it is necessary to turn the brush. This forces the handle to be turned over, thus to lowered a little more and to twist the wrist. As the handle can be pivoted or tilted, the task is made a little easier by raising the handle and avoiding the twist of the wrist.

The additional circular handle that is adaptable to the main handle without contacting the outer portion (12) of the horizontal body and by leaving enough room so as to be taken in hand has the same interest. The telescopic handle is designed to reduce the lowering effort as much as possible or even to allow the rim to be cleaned in the upright position for greater comfort.

The base (6) is an element of the kit for fixing a plurality of functional units or several horizontal bodies which is composed, according to a twelfth feature, of frames providing at least two notches arranged in a circle. Each notch enables to fix either a horizontal body or a functional unit, regardless of the method of fixation.

The base (6) can be all or portion of a circle. Its mobilization is done by means of a handle (5) which is fixed either directly or by means of the crank (7). The face of the base in contact with the rim can also be active, thus provided with orifices.

The crank (7) when it is present is fixed to the base (6) at one of its ends and enables to put the brush in motion with the handle (5) which is fixed to the other end, by holding the hollow cylindrical handle (8). The fixing zone of the crank on the base is centered.

The hollow cylindrical sleeve (8) when it is present will support the mobilization of the crank and by means of it the mobilization of the brush.

The product reservoir (9) when it is present, and as its name indicates, is used to store the cleaning product.

Whether it is fixed or adaptable, it contains the cleaning solution. This solution diffuses into the pipes (10) of the brush and evacuates at the orifices (43). The advantage of the adaptable version is that it allows the replenishment of product when the reservoir is empty and its removal for eliminating dirt due to cleaning. However, the presence of the reservoir is not compulsory.

The other advantage of the reservoir is that it can also contain a product without rinsing so as to allow rapid cleaning without the need to fully wash the rim.

The pipes (10), whether they are visible or integrated into the body of the device, allow the diffusion of the cleaning product inside the brush so as to ensure a constant flow as the shape of the rim does not allow any liquid to be retained. However, the presence of the pipes is not compulsory.

The button (41) when it is present allows the activation of the reservoir and the release of the cleaning solution.

When pressed, it brings the cleaning solution stored in the reservoir, without using the other hand or juggling between the cleaning product and the brush with the same hand. However, the presence of this button is not compulsory.

The coating covers all the active faces (44), that is the portions of the brush in direct contact with the rim. It is either in the form of bristles integrated into the body of the device, or in the form of perfectly adaptable and retractable wash cloths. According to a thirteenth feature, the shape of the wash cloths is perfectly superimposable to that of the active faces of the device and are fixed thereto, whatever the fixing system chosen and the material of the brush. The fixation prevents the sponge from moving during cleaning. Thus, as it matches perfectly the shape of the body of the device, the coating ensures a cleaning of every recesses of the rim without moving.

The orifices (43) are pierced on the active faces (44) of the device. They communicate with the pipes and allow the arrival of the cleaning solution directly in contact with the rim through the wash cloths or the bristles.

According to the particular embodiments and according to a fourteenth feature, it is expected that:

the horizontal body works alone, that is to say it represents alone the cleaning head, in which case it is provided with a handle and possibly associated with one or more other elements of the kit;

the main vertical body (2) works alone, that is to say it represents alone the cleaning head, in which case it is provided with a handle and possibly associated with one or more other elements of the kit;

the secondary vertical body (3) works alone, that is to say it represents alone the cleaning head in which case it is provided with a handle and optionally associated with one or more other elements of the kit;

the functional unit (4) works alone, in which case it is provided with a handle and optionally associated with one or more other elements of the kit;

the device is made with a base (6), in this case the latter is provided with a handle which is fixed to it either directly or by means of a crank (7). The base can be composed of at least 2 notches (40) and the notch or notches can each accommodate a functional unit or a horizontal body. The face of the base in contact with the rim can also be active, therefore provided with orifices.

The assembly may possibly be associated with one or more other elements of the kit.

In each of its embodiments, there are as many possible variants as there is choice between the single (18), double (19), multiple (20), double body (21) horizontal body; the single (28), double (29), multiple (30), single branch (25), double branch (26) or multi branch (27) main vertical bodies, the base (6) provided with one or more notches (40), which may or may not be associated with one or more other elements of the kit; even if the result of these associations is cast in one piece and whatever the material be.

BRIEF DESCRIPTION OF THE DRAWINGS

The accompanying drawings illustrate the invention. To facilitate understanding, we will illustrate the embodiments from the simplest to the most complex.

DETAILED DESCRIPTION OF THE EMBODIMENTS

Figure 1:
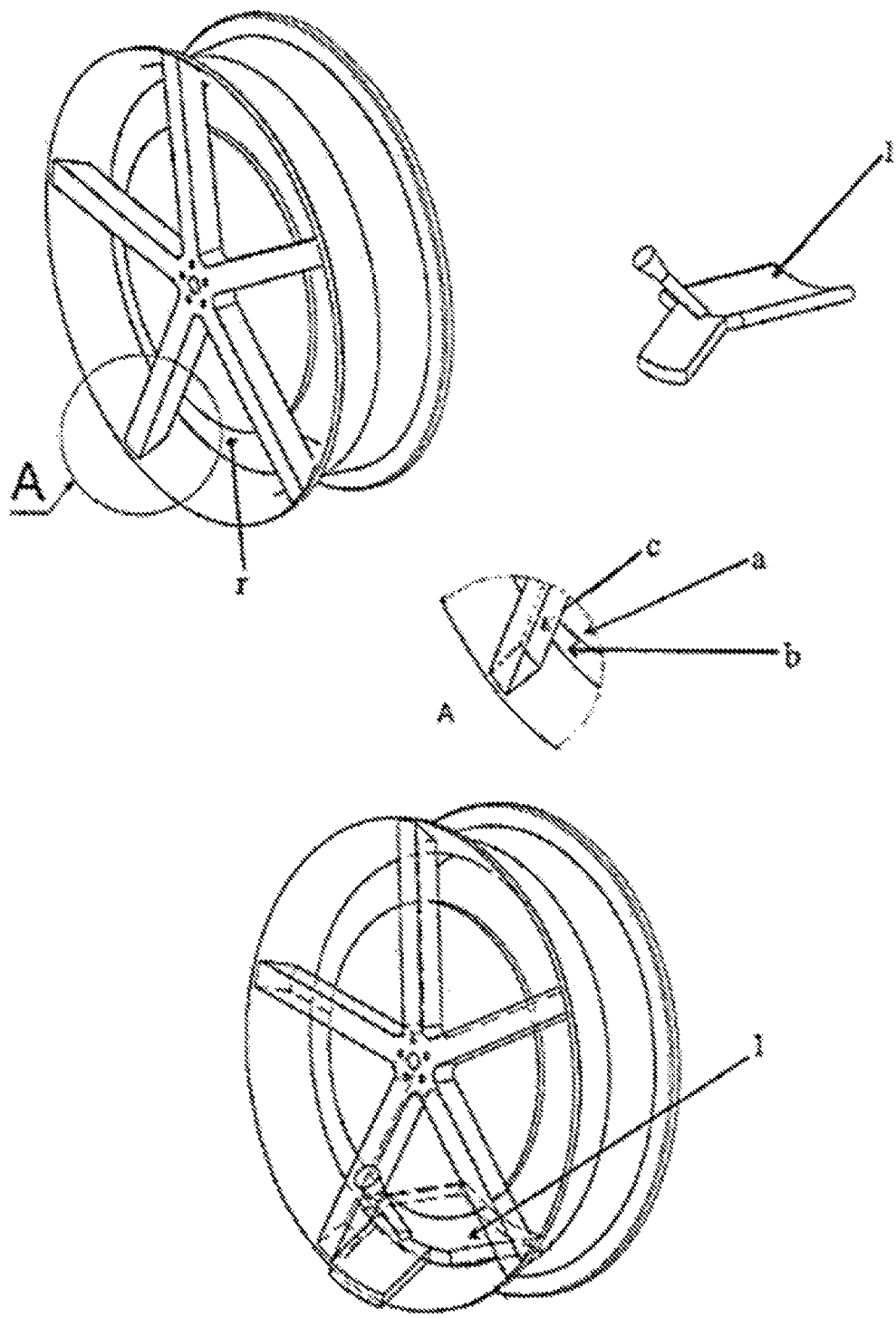
FIG. 1 illustrates in perspective views, on the one hand the structure of a rim showing the rounded portion (r) in the drawing on the top left with in section on the middle drawing the difficult cleaning zones (a) (b) (c), and secondly a cleaning head consisting solely of a horizontal body (1) on the drawing at the top right and finally this horizontal body inserted into the rim. As shown in the drawing, the horizontal body (1) slides between "the rounded portion" (r) and the brake disc (f) and, thanks to its angles, reaches the zones a and b.

According to other variants, not shown, the horizontal body may be multiple with or without a hole.

The main vertical body can be double, multiple, single branch, double branch, multi-branches. Said elements can be associate with each other in as many combinations as possible before associating with a handle and/or a secondary vertical body and/or a base which may be provided with one or more notches and/or a crank and/or a hollow cylindrical sleeve and/or a reservoir and/or pipes and/or a button and/or coating and/or orifices. All these associations can be cast in one piece.

The device is a manually operated brush but adaptable to an automatic operation system for cleaning car rims or any other stackable object which is, according to a first feature, is provided, in the form of a do-it-yourself kit and necessarily comprising a handle (5), a cleaning head represented by a horizontal body (1) or a vertical body main (2) or a secondary vertical body (3) or a functional unit (4) and accessories whose presence is not compulsory, namely a base (6), a reservoir (9), pipes (10), a button (41), a crank (7) provided with its hollow cylindrical sleeve (8), a specific coating (42) covering the active faces (44) provided with orifices (43).

According to a second feature, the association of said horizontal body (1) and main vertical body (2) forms the functional unit (4) with which may be optionally associated the secondary vertical body (3) and said horizontal body (1), said main vertical body (2), said functional unit (4) being attachable at the notches (5) of the base (6).

According to a third feature, said functional unit (4) and its components, namely said horizontal body (1), said main vertical body (2), possibly said secondary vertical body (3), each show a form of cleaning head with which is associated a handle (5), the assembly being associated or not to the base (5), the crank (7) with its hollow cylindrical sleeve (8), the reservoir (9), the pipes (10) provided with orifices (43), the button (41), the coating (42); the association of the elements of the kit can therefore be partial or total, even if the result of this association is cast in one piece, regardless of the method of fixing said elements.

FIG. 1 illustrates on the one hand the structure of a rim showing the rounded portion (r) in the top left drawing including, in a sectional view in the middle drawing, the difficult-access zones (a) (b) (c) and on the other hand a cleaning head only composed of a horizontal body (1) in the top right drawing and at last this horizontal body inserted in the rim. As shown in the drawing, the horizontal body (1) slides between the "rounded portion" (r) and the brake disc (f) and, thanks to its angles, reaches the zones a and b.

Figure 2:
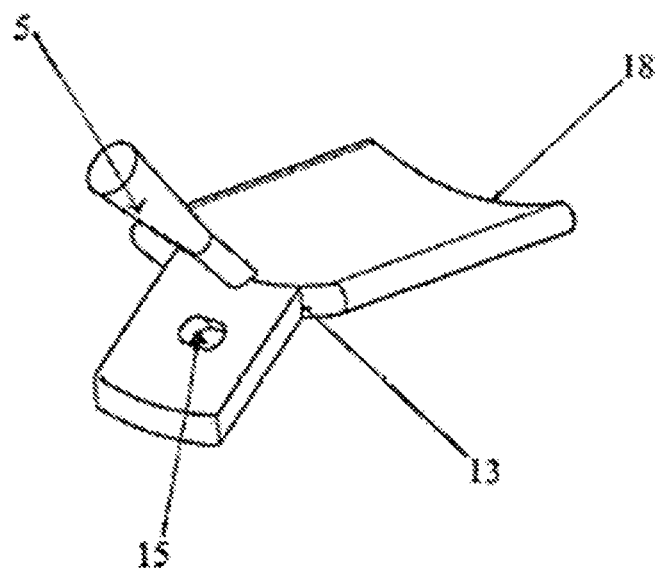
FIG. 2 illustrates in perspective, profile and front views a cleaning head composes of a single horizontal body (18) with its inner portion (11) and its outer portion (12), pierced with a hole (15), its upper specific angle (13), its lateral specific angle (14) and its handle (5).
Figure 2:
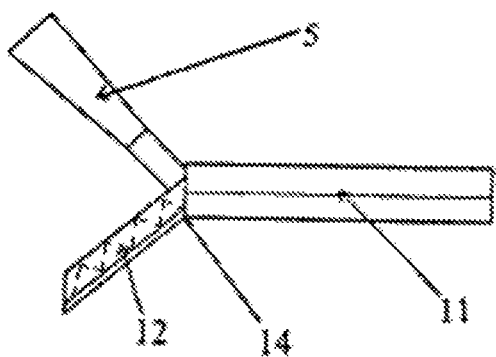
Figure 2:
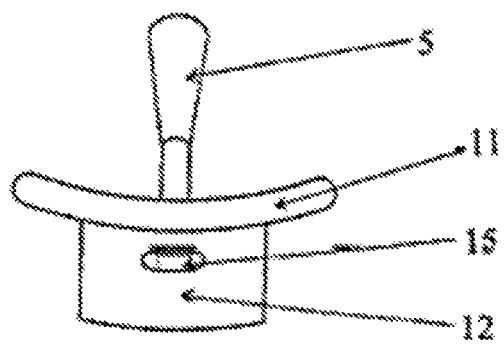

The embodiment of said horizontal body is also represented in the following figure. In the embodiment according to FIG. 2, the horizontal body is unique (18). According to a fourth feature, the horizontal body is itself composed of two portions. An inner portion (11) of thin thickness in an frontal plane, follows a concave shape matching the rounded portion (r) of the rim; an outer portion (12) also of small thickness and inclined with respect to the plane of the inner portion (11) according to a lateral specific angle (14) which can vary between 0 to 90° so that it matches the offset of the rim with the possibility of contacting the adjacent portion of tire. This outer portion is plane here.

According to a fifth feature, as the outer portion (12) is always narrower than the inner portion (11), the junction zone of these two portions becomes automatically more hollow with a higher specific angle (13).

Thus, the inner portion of thin thickness slides between the brake disc and the rounded portion to reach the zone (a) beyond said brake disc; the higher specific angle (13) enables access to the zone (b) hidden by the branch.

The dimensions of the horizontal body are variable depending on the rim cleaned but are defined so that the length can reach the inner edge of the rim and even the offset so as to mobilize it easily, the width enables to insert it between two adjacent spokes, the thickness enables to slide it between the brake disc and the rim, the spoke is superimposable on that of the cleaned rim.

As a non-limiting example, if the distance between two neighboring spokes is equal to 10 cm, with a rounded portion "r" having a radius of 20 cm, the distance between the rounded portion and the brake disc being equal to 5 cm, the width of the rounded portion being equal to 15 cm from one edge to the other, the body horizontal will be 17 cm in length with a radius of 20 cm, a width of 9 cm and a thickness of 1 cm so as to mobilize it easily.

According to a sixth feature, the horizontal body may be pierced with a hole (15). The dimensions of the hole for passing the valve are defined so that the brush does not contact said valve when moving.

The dimensions and the position of the handle (5) are also variables. The handle is defined so as to accommodate a push button (41) and is positioned so that the hand does not contact any element of the rim during cleaning in order to avoid injury.

Figure 3:
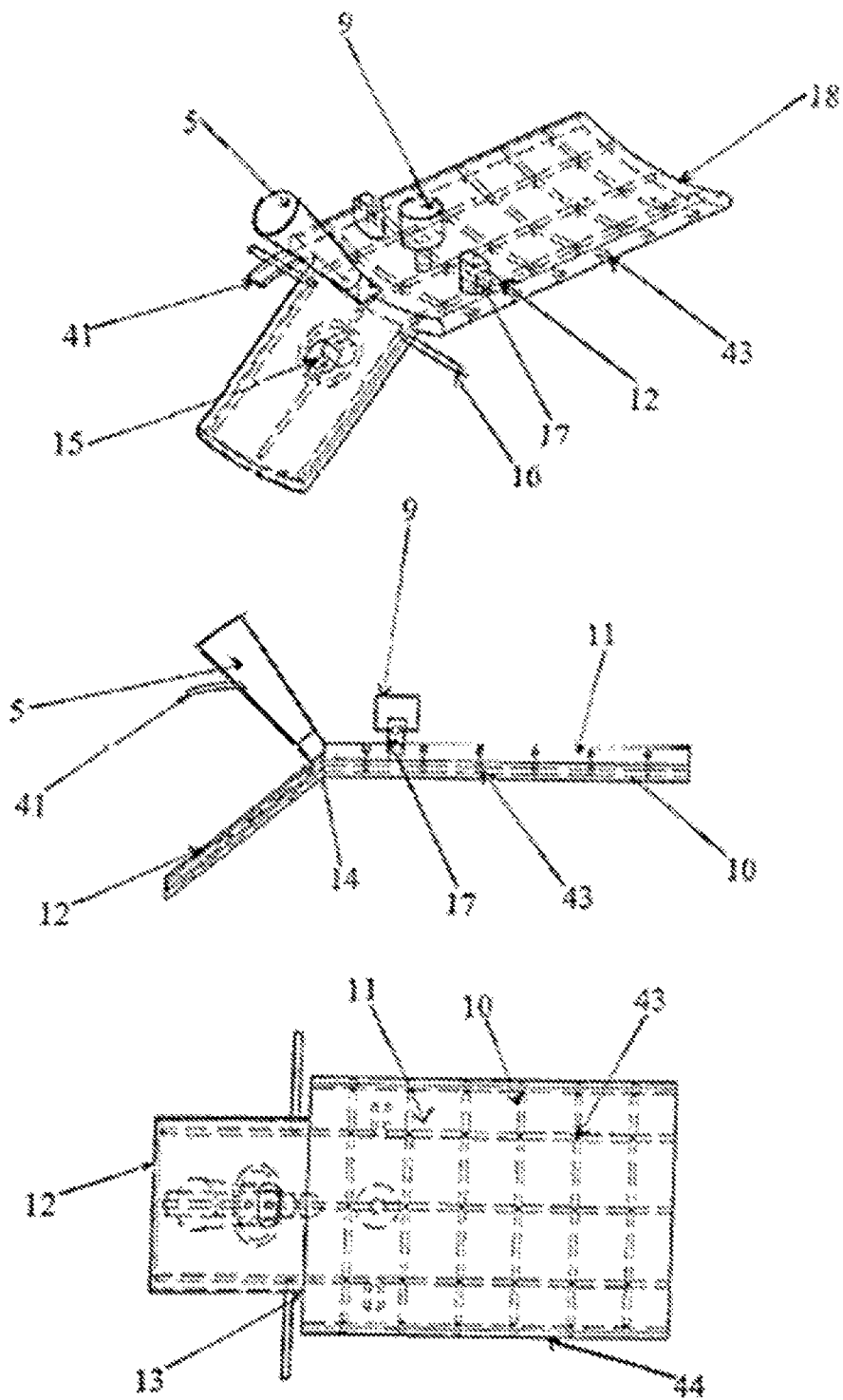
FIG. 3 illustrates in perspective, profile and bottom views, a variant having a cleaning head composed of a single horizontal body (18) working alone in association with a handle (5), a button (41), a reservoir (9), pipes (10), and orifices (43). The coating has not been shown so as not to hide said orifices on the active face 44). The position of the reservoir is variable but must not interfere with movements or hit any portion of the rim. In this figure, said reservoir is positioned on the inner portion (11) of the horizontal body.

The embodiment according to FIG. 3 represents in perspective, profile and bottom views a variant of the preceding form provided with accessories, namely the pipes (10), the reservoir (9), the button (41), the orifices (43) visible on the active face (44) and the lateral faces of the horizontal body (18). The coating has not been represented so as not to hide the orifices.

Figure 4:
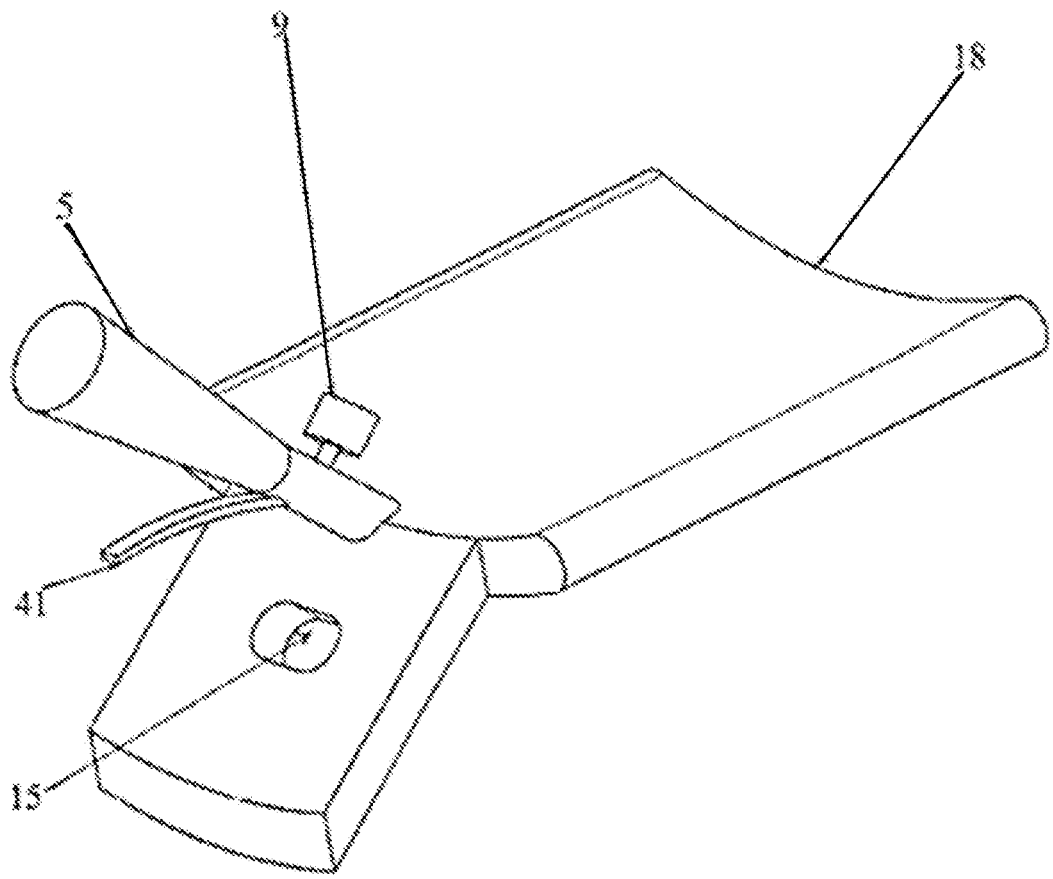
FIG. 4 illustrates, in a perspective view, a variant of the preceding figure with a cleaning head represented by a single horizontal body (18) associated with a handle (5), a button (41) and a reservoir (9) positioned on the handle (5).

The embodiment according to FIG. 4 illustrates, in a perspective view, a variant with a cleaning head represented by a single horizontal body (18) associated with a handle, a button (41) and a reservoir positioned on the handle (5). The dimensions of the reservoir vary, but it should not hinder the movements.

Figure 5:
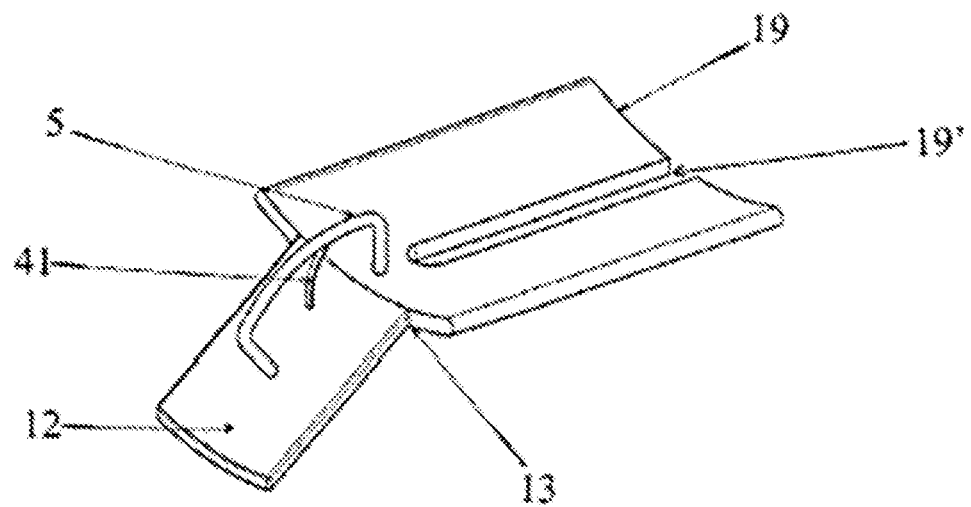
FIG. 5 illustrates in perspective and sectional views a variant with a cleaning head composed of a horizontal double body (19) with its two portions separated by a space (19') and working alone with a handle (5), a button (41), without any other accessories.
Figure 5:
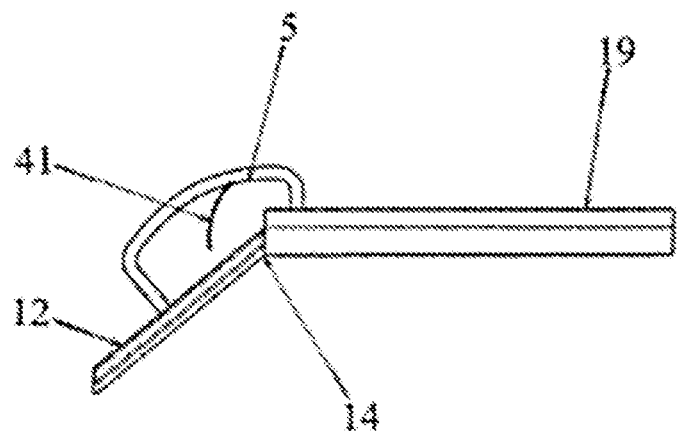

The embodiment according to FIG. 5 shows, in perspective and sectional views, a variant of said brush provided with a cleaning head composed of a double horizontal body (19) with its two portions separated by a space (19'), associated with a handle (5) and a push button (41) without any other accessories. The dimensions of the space (19') between the two portions of the horizontal body are defined so that a rim spoke can slip therebetween. This variant is meant to multi-spoke and thin rims.

Figure 6:
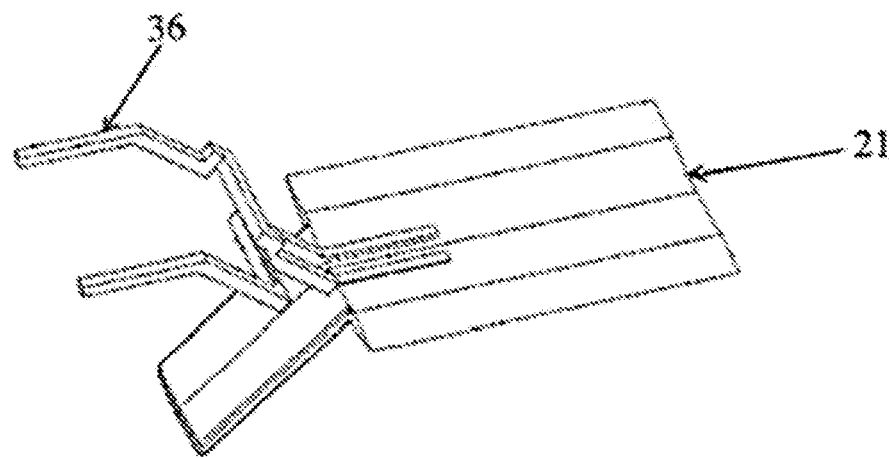
FIG. 6 illustrates in perspective views a cleaning head composed of a double body horizontal body (21) associated with a double handle (36) without any accessories. In the upper drawing, said horizontal body is in the closed position and in the bottom drawing it is in the open position showing the space between the two portions (21').
Figure 6:
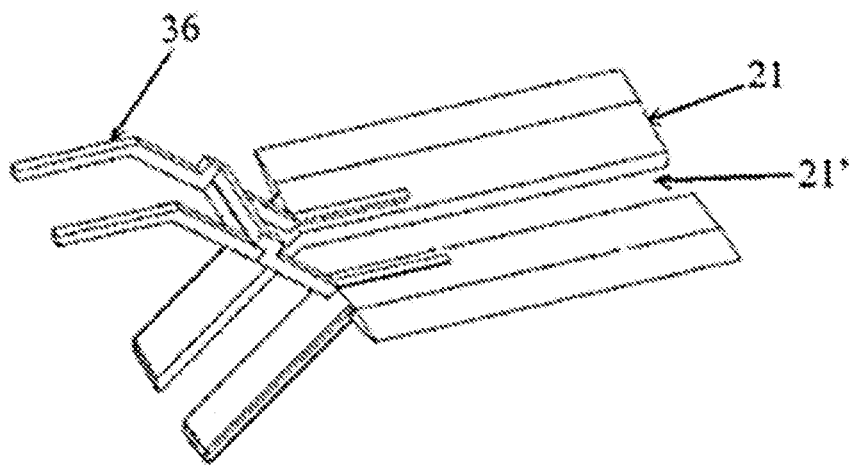

The embodiment according to FIG. 6 shows, in a perspective view, a variant of said brush provided with a cleaning head composed of a double body horizontal body (21) associated with a double handle (36) without any other accessories. In the top drawing, said horizontal body is in the closed position and, in the bottom drawing, it is in the open position showing the space between the two portions (21').

Moving the handle causes the horizontal body to open or to close resulting in a translational movement. This operation is meant to reduce the alternating movements during cleaning. If the horizontal body (21) is associated with a main vertical body (2), this movement also enables to clean the adjacent spokes without any extra effort.

Figure 7:
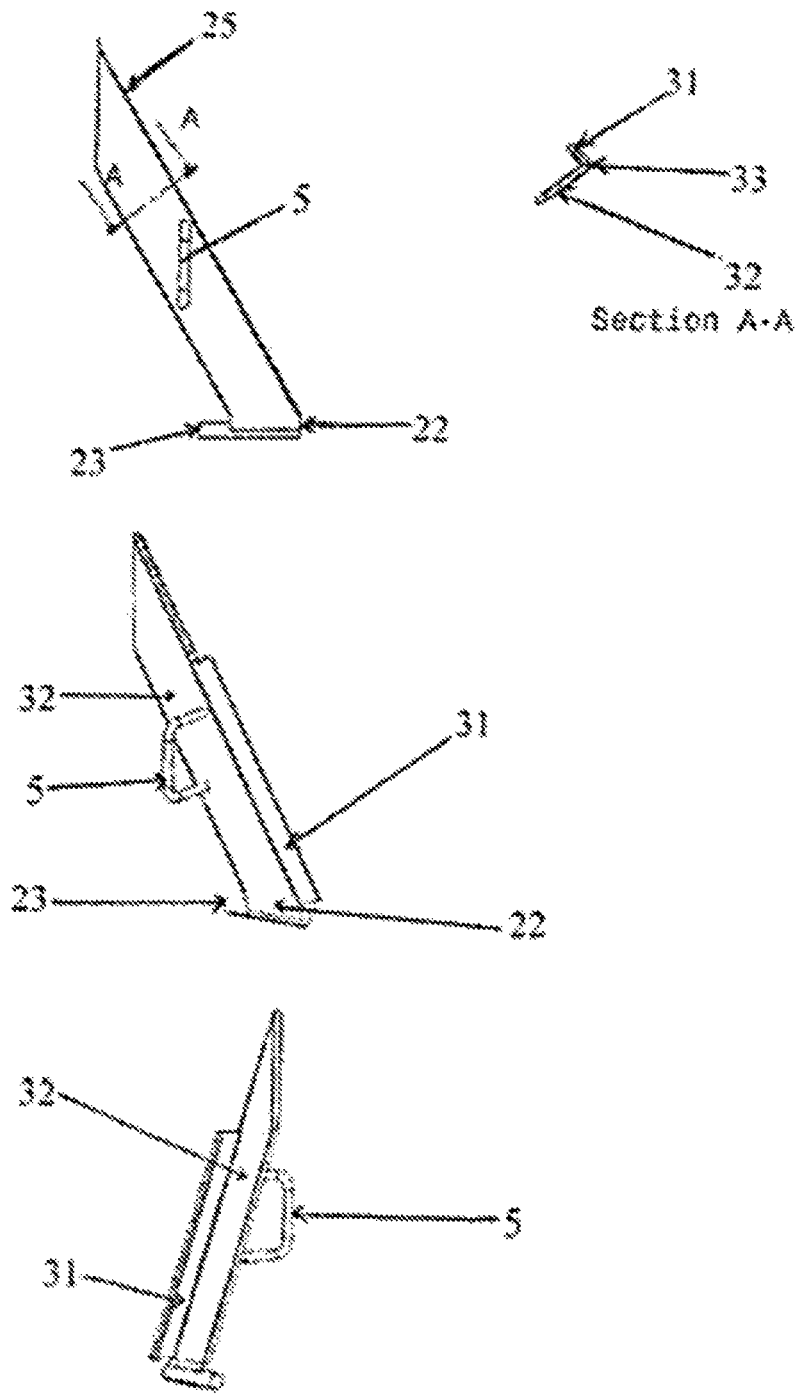
FIG. 7 illustrates, in front and perspective views, a cleaning head composed of a single, single branch (25) main vertical body, its support (22), its appendix (23) and working alone with a handle (5) without any other accessories. The sectional view illustrates the inner face (31) and the outer face (32) of said main vertical body as well the angle (33) joining them.

The embodiment according to FIG. 7 illustrates, in a front and perspective views, a variant of said brush provided with a cleaning head represented by the vertical main body which is here single, single branch (25), with its support (22), its appendix (23) according to a seventh feature and working alone with a handle without any other accessories.

According to an eighth feature, each vertical branch of the main body is composed of at least two faces with an inside face (31) and an outer face (32) of thin thickness which are joined with an angle (33) ranging from 0 to 180 degrees excluded as shown in the sectional view. In this figure, the angle is 90°.

Still, in the same figure, it is seen that the inner face (31) is much less high and wide than the outer face (32) according to a ninth feature.

According to a tenth feature, each branch of the vertical body is inclined in two planes. This inclination varies, in the frontal plane, between 0 and 90 degrees excluded and, in the sagittal plane, between 0 and 90 degrees also excluded in order to adapt the configuration of the brush to that of the cleaned rim.

By way of a non-limiting example, for a rim provided with a spoke having the following dimensions: outer face 30 cm in height, 5 cm in width, inner surface 25 cm in height due to the angle formed by the union with the inner face of the adjacent branch, 5 cm in width; distance relative to the brake disc of 5 cm, the main vertical body will have the following dimensions: outer face (32) 30 cm in height, 5 cm in width, inner face (31) 23 cm in height so as not to contact the above-mentioned angle, 7 cm in width showing a distance with respect to the brake disc of 3 cm. In this way, said brush can be mobilized without contacting the brake disc.

Figure 8:
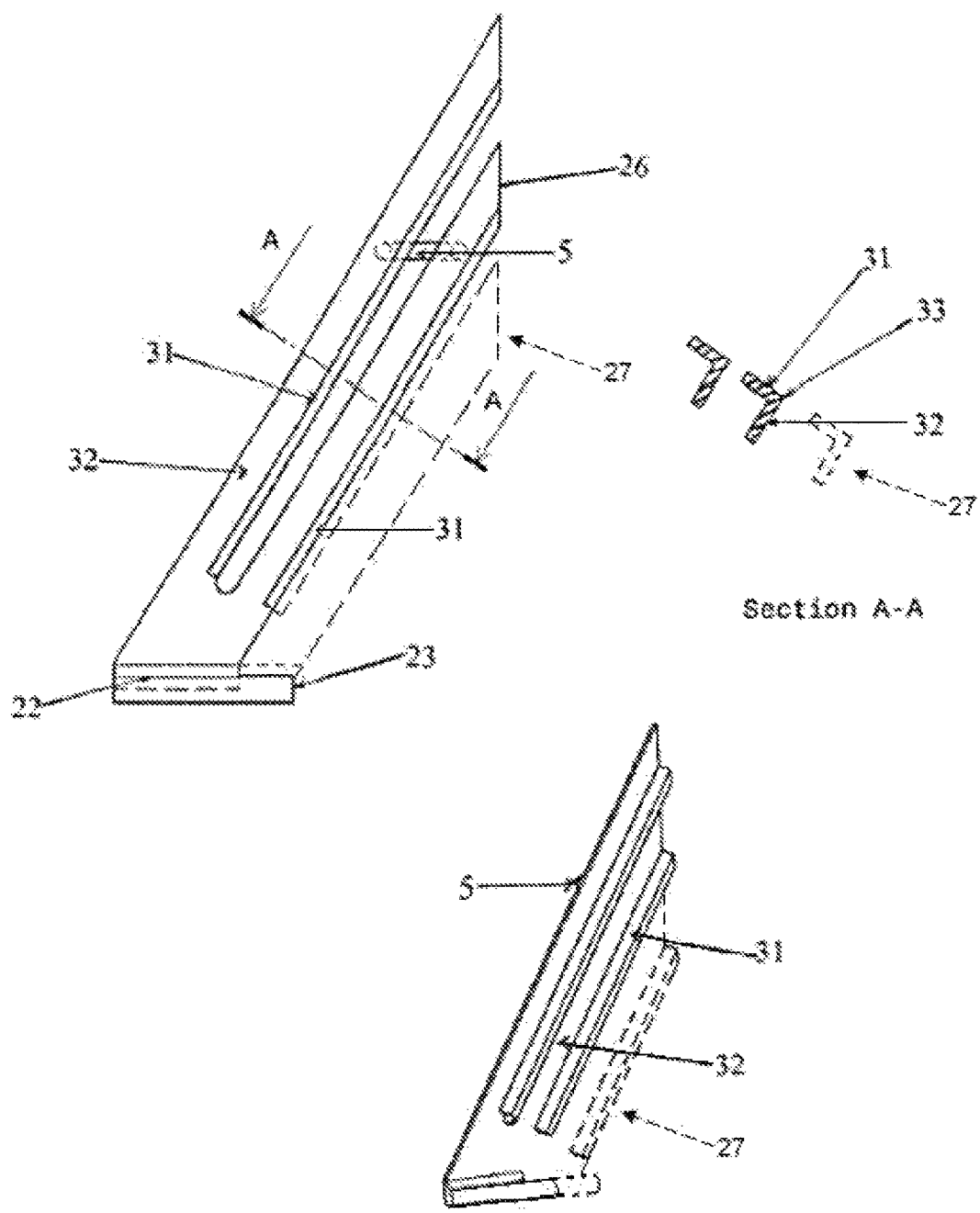
FIG. 8 illustrates, in front and perspective views, a variant with a cleaning head composed of a single, double branch vertical main body (26) working alone with a handle (5) without any accessories. The sectional view shows the inner face (31), the outer face (32) of each of the branches of the single, double branch main vertical body (26) as well as the angle (33) joining them.

The embodiment, according to FIG. 8, shows, in front and perspective views, a variant of said brush provided with a cleaning head composed of a single, double-branch (26) main vertical body working alone with a handle (5) without any accessories. The position of the handle (5) is variable. The dimensions comply with the same features as previously, outside the size of the space between the two arms which varies according to the rim cleaned. This type of configuration is designed for multi-spoke and thin rims, said spoke must slip into said space. The sectional view shows the inner face (31), the outer face (32) of each of the branches of the single, double branch (26) main vertical body as well as the angle (33) joining them.

Figure 9:
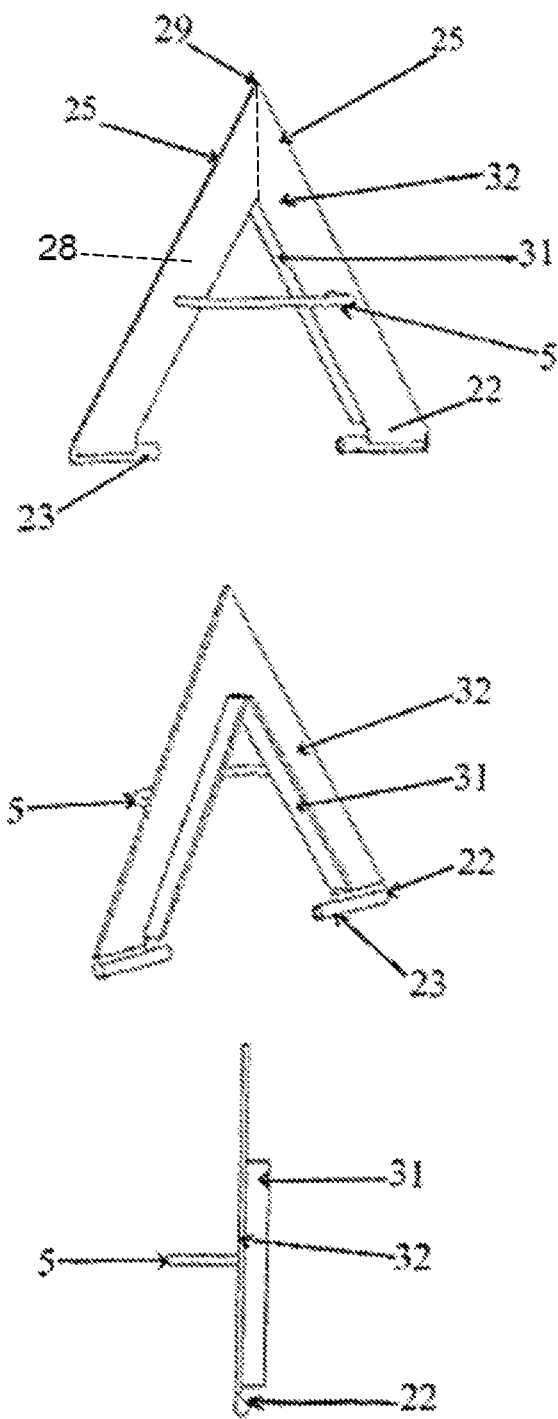
FIG. 9 illustrates, in perspective and profile views, a variant with a cleaning head composed of a double (29), single branch (25) main vertical body working alone with a handle (5) without any accessories.

The embodiment according to FIG. 9 shows, in perspective, front and profile views, a variant of said brush provided with a cleaning head composed of a double (29), single branch (25) vertical main body working alone with a handle (5) without any accessories. The position of the handle is variable, here central.

In this variant, the second main vertical body is positioned symmetrically to the first. The dimensions of the faces of each branch are the same as those above-mentioned.

Figure 10:
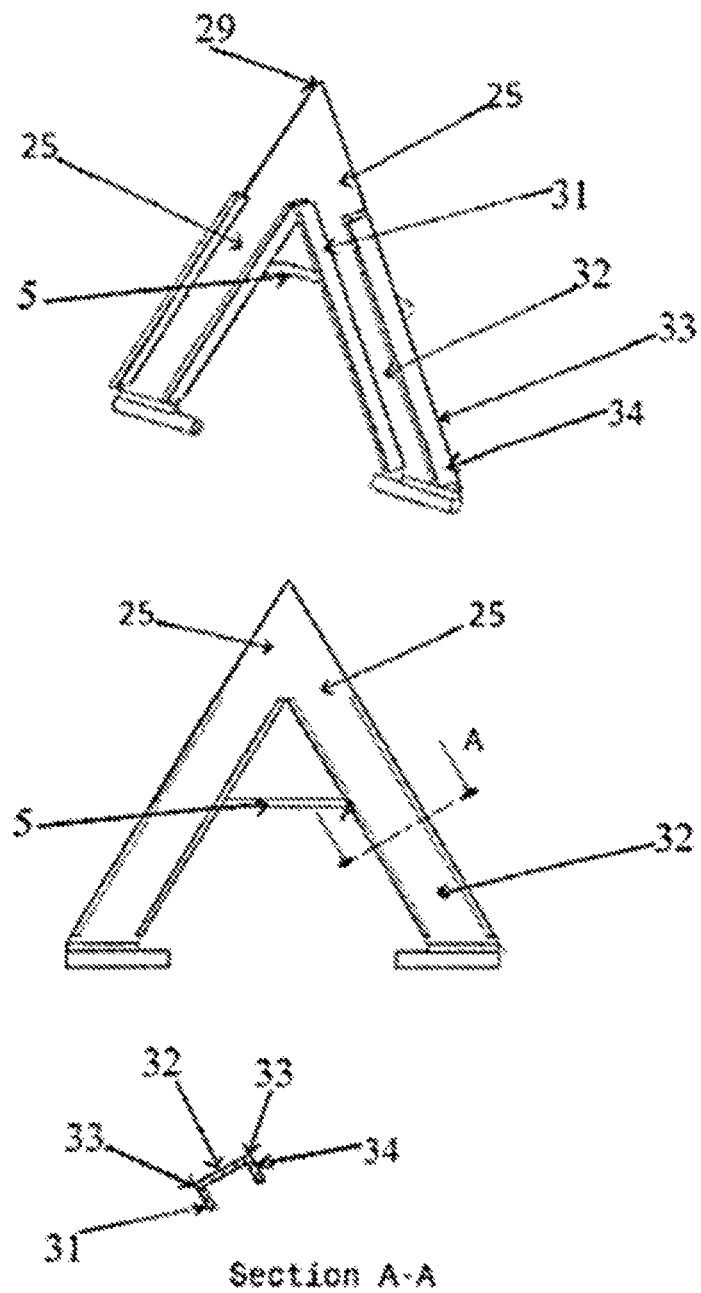
FIG. 10 illustrates in perspective, front and sectional views, a variant with a cleaning head composed of a double (29), single branch (25) main vertical body having three faces (31) (32) (34) joined together by their angles (33) and working alone with a handle, without any accessories.

The embodiment according to FIG. 10 illustrates, in perspective, front and sectional views, a variant of said brush provided with a cleaning head composed of a main double (29), single branch (25) vertical main body whose branches have 3 faces (31) (32) (34), working alone with a handle (5) without any accessories. The third face (34) has the same features as those of the inner face (31). The dimensions are the same as those described for FIG. 7.

Figure 11:
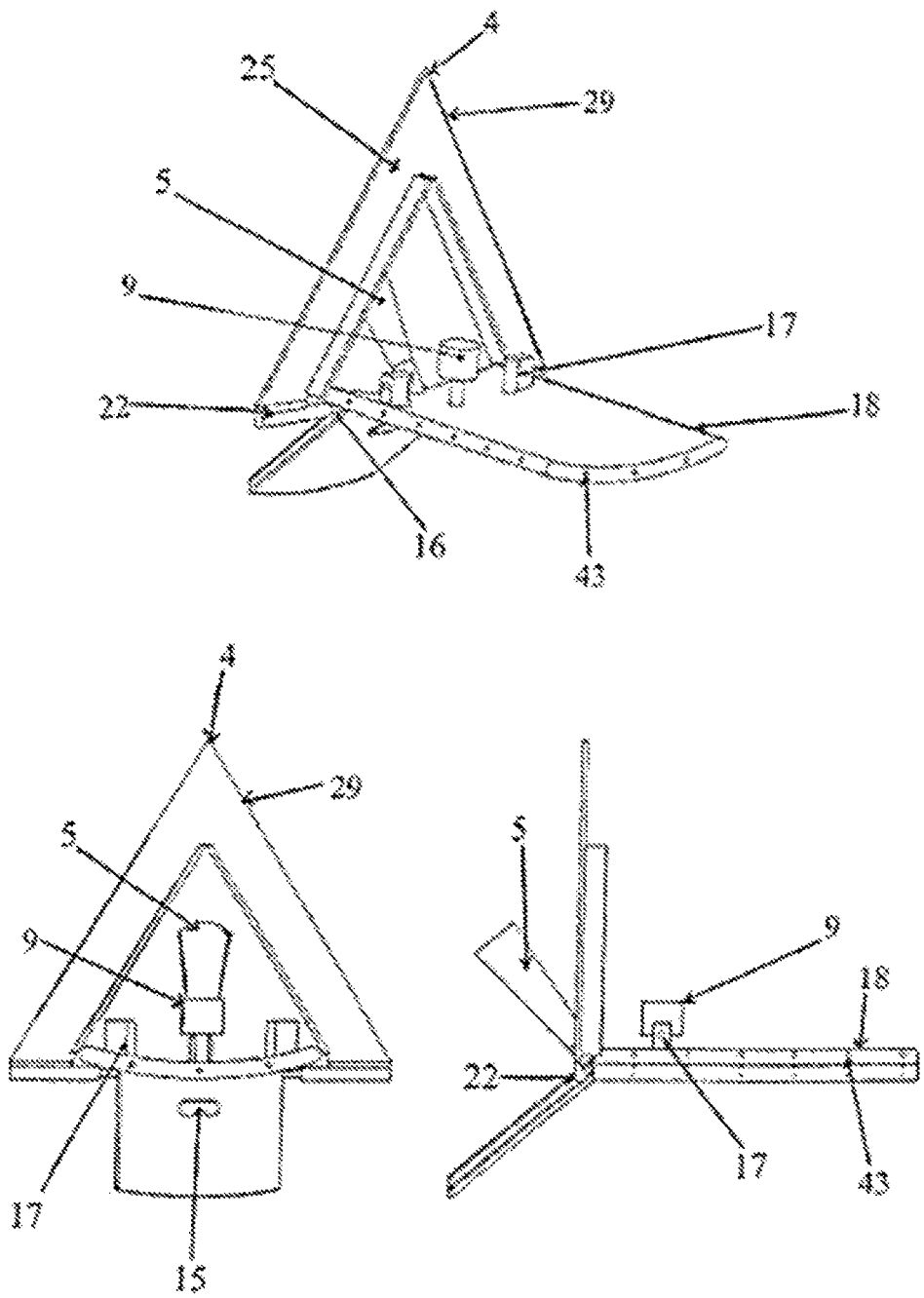
FIG. 11 illustrates in perspective, front and profile views, a variant with a cleaning head composed of a functional unit (4) working alone, itself composed of a single horizontal body (18), with a hole (15), a double (29), single branch vertical body and a handle (5) associated with a reservoir (9) and pipes opening into the orifices (43).

The embodiment according to FIG. 11 illustrates, in perspective, front and profile views, a variant provided with a cleaning head composed of a functional unit (4) working alone, itself composed of a single horizontal body (18), with a hole (15), a double (29), single branch (25) vertical body and a handle (5) associated with a reservoir (9) and pipes, not visible in this figure, opening into the orifices (43).

Said main vertical body is fixed, by its appendix (23) located at its support (22), to the distal appendix (17) of said horizontal body. Said horizontal body and said main vertical body have the same features as those described above. It should be noted that said appendixes can impart said main vertical bodies their inclination. The dimensions also respect those above-mentioned.

Figure 12:
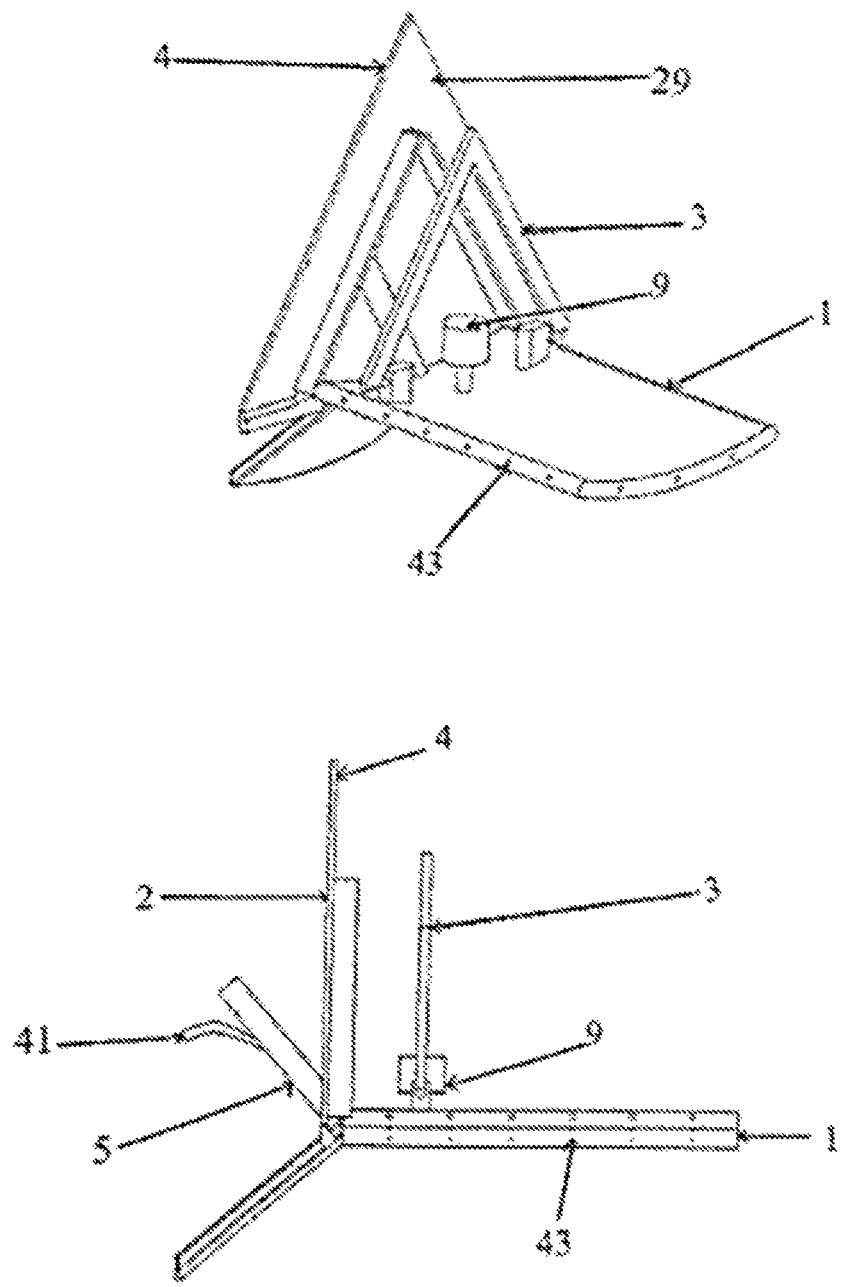
FIG. 12 illustrates in perspective and profile views, a variant of said brush with a cleaning head composed of a functional unit (4), itself composed of a horizontal body (1) and a main vertical body (2) associated with a secondary vertical body (3), pipes opening into the orifices (43) and a reservoir (9) without any other accessories.

The embodiment according to FIG. 12 illustrates, in perspective and profile views, a variant provided with a cleaning head represented by the functional unit itself composed of a horizontal body (1), a main vertical body (2), a vertical accessory body (3) associated with a handle (5), a push button (41), pipes not visible in this figure opening into the orifices (43) and a reservoir (9) without any other accessories.

The dimensions of the secondary vertical body (3) are defined so that it can first slip into the space between two adjacent spokes of the same rim then between the spoke of the rim and the brake disc so as to be able to mobilize it without contact that last. The dimensions of the horizontal body (1), the main vertical body (3) and the handle (5) meet the same criteria as those above-mentioned.

Figure 13:
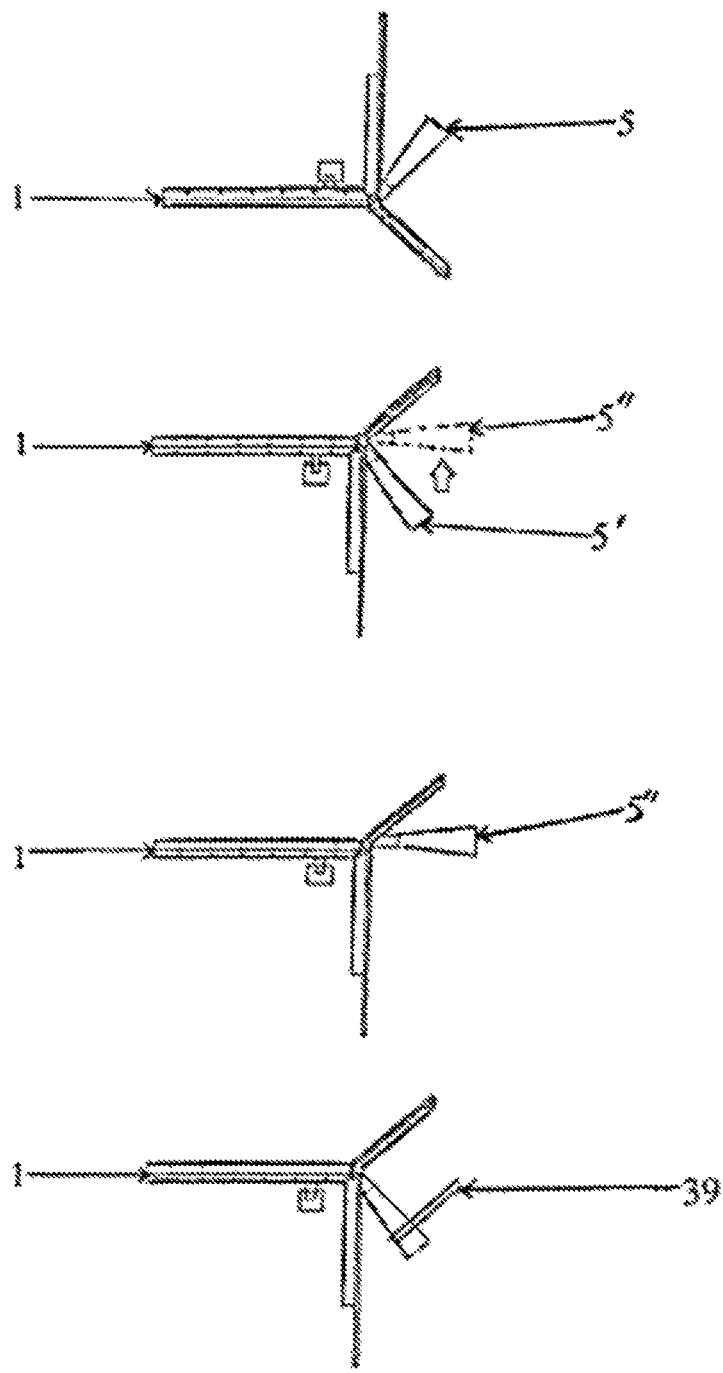
FIG. 13 illustrates in profile views, the various aspects of the handle according to an eleventh feature. In the top drawing, the horizontal body (1) is in the normal working position and is supposed to clean the lower portion of a rim. In the bottom drawing, the horizontal body (1) turned over is supposed to clean the upper portion of the rim. One can note the handle (5) pivoting between its initial position (5') and the position caused by the tilting or pivoting (5"). In the third drawing, the handle is in tilting position (5") on a horizontal body always oriented towards the upper portion. In the bottom drawing one can note the additional circular handle (39) fixed to a handle (5') in the normal position.

The embodiment according to FIG. 13 illustrates, in profile views, different presentations of the handle in accordance with an eleventh feature. In the top drawing, the horizontal body (1) in the normal working position is supposed to clean the lower portion of a rim. In the bottom drawing, the horizontal body (1) turned over is supposed to clean the upper portion of the rim. It should be noted that the handle can tilt from its initial position (5') to the position cause by the tilting or pivoting (5"). In the third drawing, the handle is in tilting position (5''') on a horizontal body still oriented towards to the upper portion. In the bottom drawing, it should be noted the additional circular handle (39). The position of the handle on the cleaning head is variable but the tilting and the addition of an additional handle should remain possible. The dimensions of the handle must enable an easy grasp and, in addition, to meet the above-mentioned criteria. Furthermore, the handle can have different presentations. It may be conical as in FIG. 2 or 3 but also have the shape of an arched handle as in FIG. 5 or 7.

Figure 14:
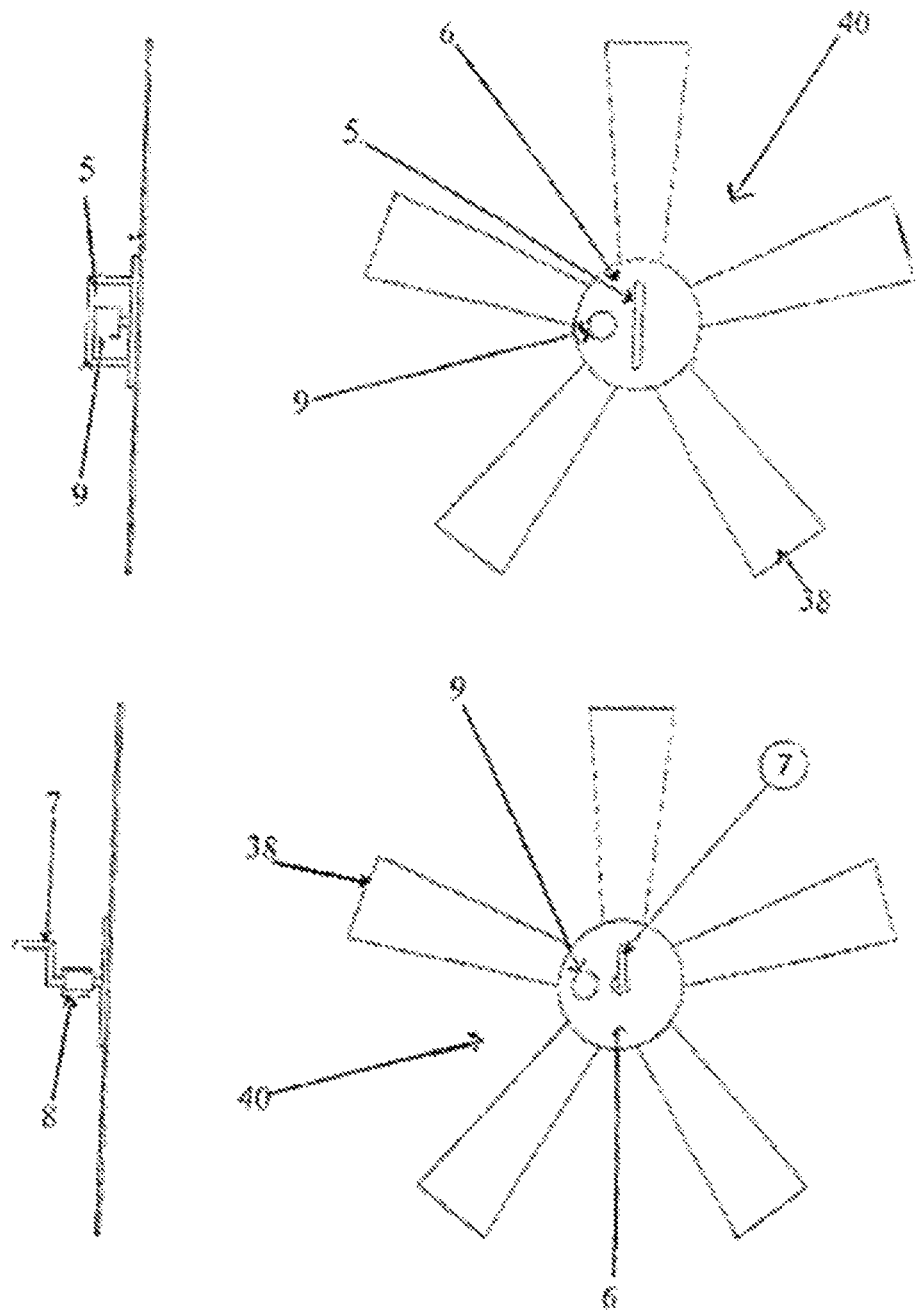
FIG. 14 illustrates in front and profile views, in the top drawings, a base (6) with a handle (5) which is directly secured thereto and, in the lower drawings, a base the handle of which is fixed by means of the crank (7) provided with its hollow cylindrical sleeve (8). This base is composed of frames (38) provided with notches (40). A reservoir (9) without any other accessories is associated thereto.

The embodiment according to FIG. 14 illustrates, in front and profile views in the top drawings, a base (6) provided with a handle that is fixed directly thereto and, the bottom drawing, a base (6) whose handle is fixed via a crank (7). Said base is composed of frames (38) providing notches (40). A reservoir (9) is associated therewith without any other accessories. Said base is complete here that is it forms a circle and comprises five notches (40). Each notch is adapted to receive a horizontal body or a functional unit. The dimensions of the notches are directly correlated with those of the horizontal body (1) or the functional units (4) and thus the rim.

The base can also accept accessories such as the reservoir, the crank provided with its hollow cylindrical sleeve (8) represented here. The face of the base in contact with the rim can also be active, therefore provided with orifices.

Figure 15:
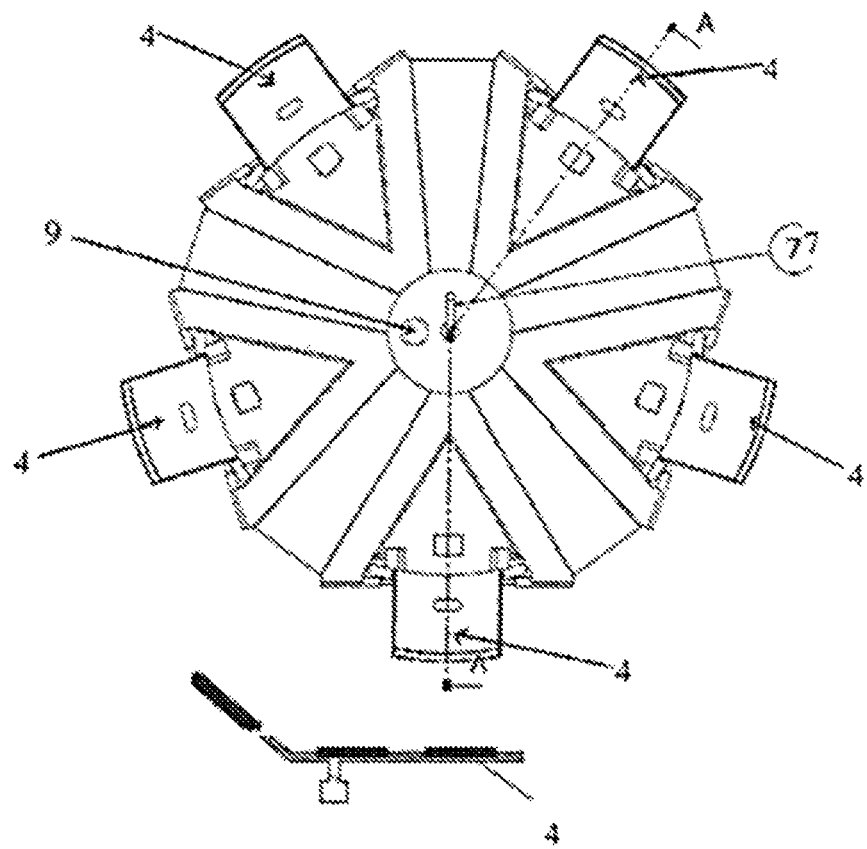
FIG. 15 illustrates in a front and sectional views, said brush with a cleaning head composed of five functional units (4) inserted in a base provided with 5 notches (40) associated to a handle (5) fixed thereto by means of a crank (7) and a reservoir (9) without any other accessories.
Figure 15:
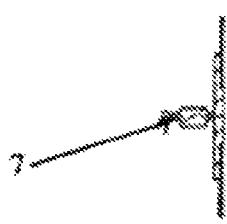
Figure 15:
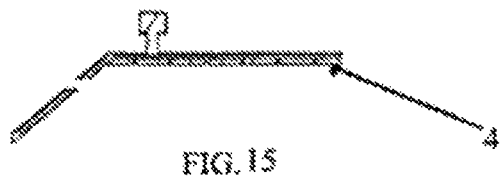

The embodiment according to FIG. 15 illustrates, in front and sectional views, a variant provided with a cleaning head composed of five functional units (4) inserted in a base provided with 5 notches (40) associated to a handle which is fixed thereto by means of a crank (7) provided with its hollow cylindrical sleeve (8), a reservoir (9) without any other accessories. The dimensions of the base (6) and functional units (4) meet the same criteria as above. It should be noted that the horizontal body or the functional unit which is fixed to the base may be provided with its own handle which automatically becomes inactive. If the functional unit is specifically meant to be incorporated into a base, the handle (5) can be suppressed when designing it, such in this figure.

This brush is meant to clean of mechanical rims especially for cars. Given the number of cars on the road, about 40 million in France alone, making it available to the greatest number of motorists is possible only with an industrial production.

The invention claimed is:

1. A manually operable brush configurable to an automatic operating system to clean car rims or other superimposable object, the brush presented as a do-it-yourself kit and comprising a handle, a cleaning head comprising a horizontal body, a main vertical body, an optional secondary vertical body, and non-compulsory accessories comprising a base, a reservoir, pipes provided with orifices, a button, a crank provided with a hollow cylindrical sleeve, and a coating covering active faces of the brush; wherein said horizontal body operating in a horizontal position comprises an inner portion with a concave shape in a frontal plane matching a rounded portion of a car rim, the inner portion is sub-divisible into a plurality of branches to provide a single, double or multiple body shapes; wherein said horizontal body comprises an outer portion, inclined relative to the frontal plane of the inner portion, with a lateral angle varying between 0 to 90°, the outer portion being rounded, planar or all intermediate shapes therebetween, and the outer portion comprising angles and break points, the main vertical body, operating in a vertical position, comprising a support comprising an appendix and at least one branch sub-divisible into a plurality of branches, each branch being carried by the same support, thereby providing the main vertical body with a single-branch, a double branch or multiple branches.

2. The brush configured as a kit according to claim 1, wherein an association of said horizontal body and the main vertical body forms the cleaning head with which the secondary vertical body is associated therewith; and wherein the main vertical body and the cleaning head are configured to be fixed at notches in the base.

3. The brush configured as a kit according to claim 1, wherein each of said horizontal body, said main vertical body and said secondary vertical body represents a form of the cleaning head associated with the handle to provide an assembly, the assembly being associable to one or more of said non-compulsory accessories of the kit.

4. The brush configured as a kit according to claim 1, wherein the horizontal body is pierceable with a hole to receive a valve.

5. The brush configured as a kit according to claim 1, wherein said each branch of the main vertical body comprises at least two faces to provide an inner face and an outer face, the inner and outer faces are joined at an angle which can vary from 0 to 180 degrees.

6. The brush configured as a kit according to claim 5, wherein the inner face of a branch of the main vertical body is shorter and narrower than the outer face of said branch of the main vertical body.

7. The brush configured as a kit according to claim 1, wherein said each branch of the main vertical body is inclined in the frontal plane between 0 and 90 degrees.

8. The brush configured as a kit according to claim 7, wherein said each branch of the main vertical body is inclined in a sagittal plane between 0 and 90 degrees excluded.

9. The brush configured as a kit according to claim 1, wherein the handle is configured to receive the reservoir; and wherein the handle is configured to be at least one of the following: pivotable, tiltable in an opposite direction, and adaptable to an additional circular handle or a telescopic handle.

10. The brush configured as a kit according to claim 1, wherein the base is configured to fix a plurality of cleaning heads or horizontal bodies, the base comprises frames providing at least two notches arranged in a circle, each notch comprising a structure to enable either a respective horizontal body or a respective cleaning head to be fixed thereon.

11. The brush configured as a kit according to claim 1, wherein said coating is superimposable on and fixed to active faces of the brush.

12. The brush configured as a kit according to claim 1, wherein the horizontal body, the main vertical body or the cleaning head operates alone to be a sole element of the cleaning head, the sole element of the cleaning head is provided with the handle and associated with one or more non-compulsory accessories of the kit.

13. The brush configured as a kit according to claim 1, wherein the base comprises at least two notches arranged in a circle, each notch configured to fix the horizontal body or the cleaning head; wherein the handle is fixed to the base either directly or by a crank; and wherein the base is associated with one or more non-compulsory accessories of the kit.

* * * * *